No. 653,242. Patented July 10, 1900.
A. T. HOLT.
APPARATUS FOR PLACING LINING IN OPENINGS IN PLASTIC MATERIAL.
(Application filed Oct. 24, 1899.)
(No Model.) 2 Sheets—Sheet 1.
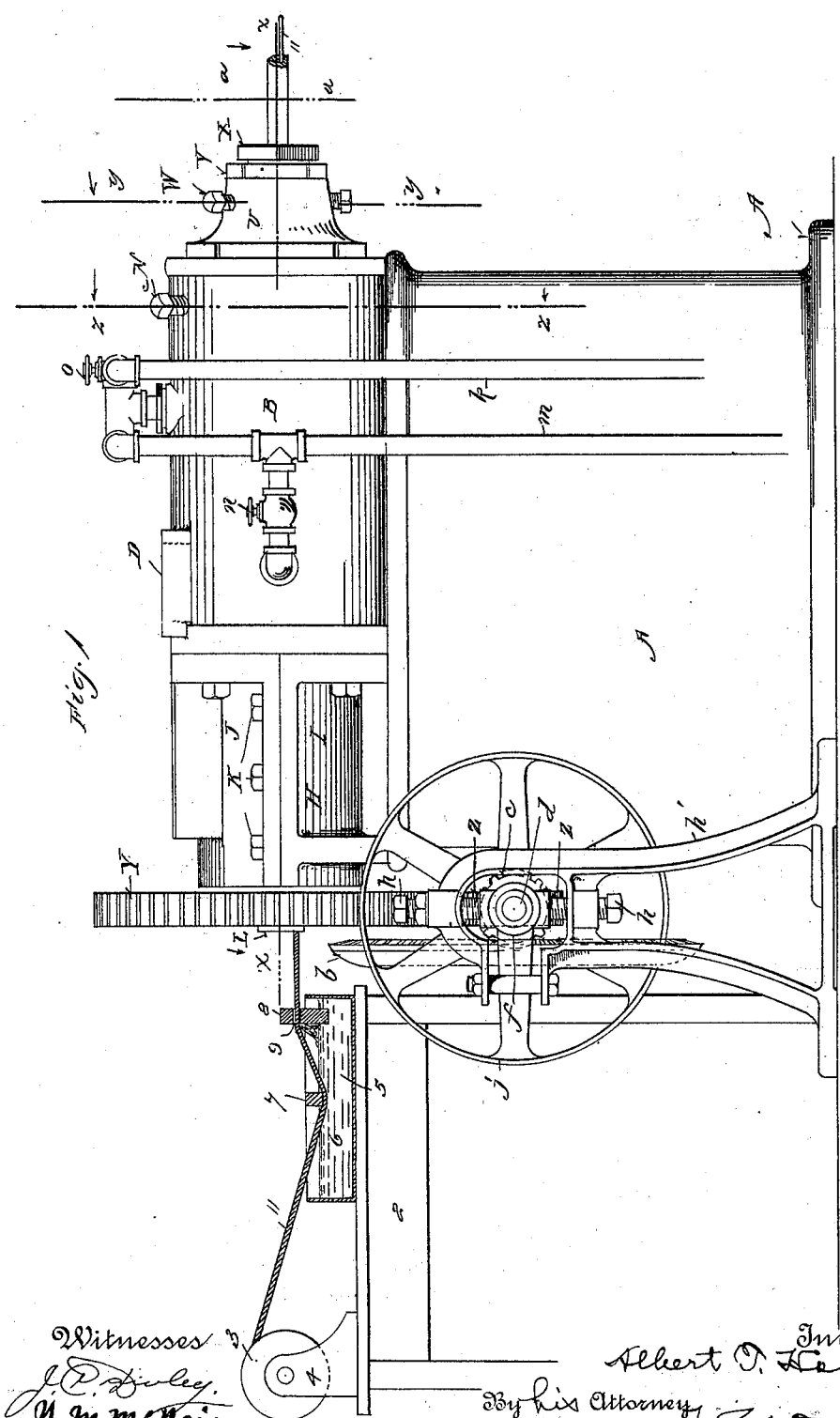
Witnesses
Inventor
Albert T. Holt,
By his Attorney

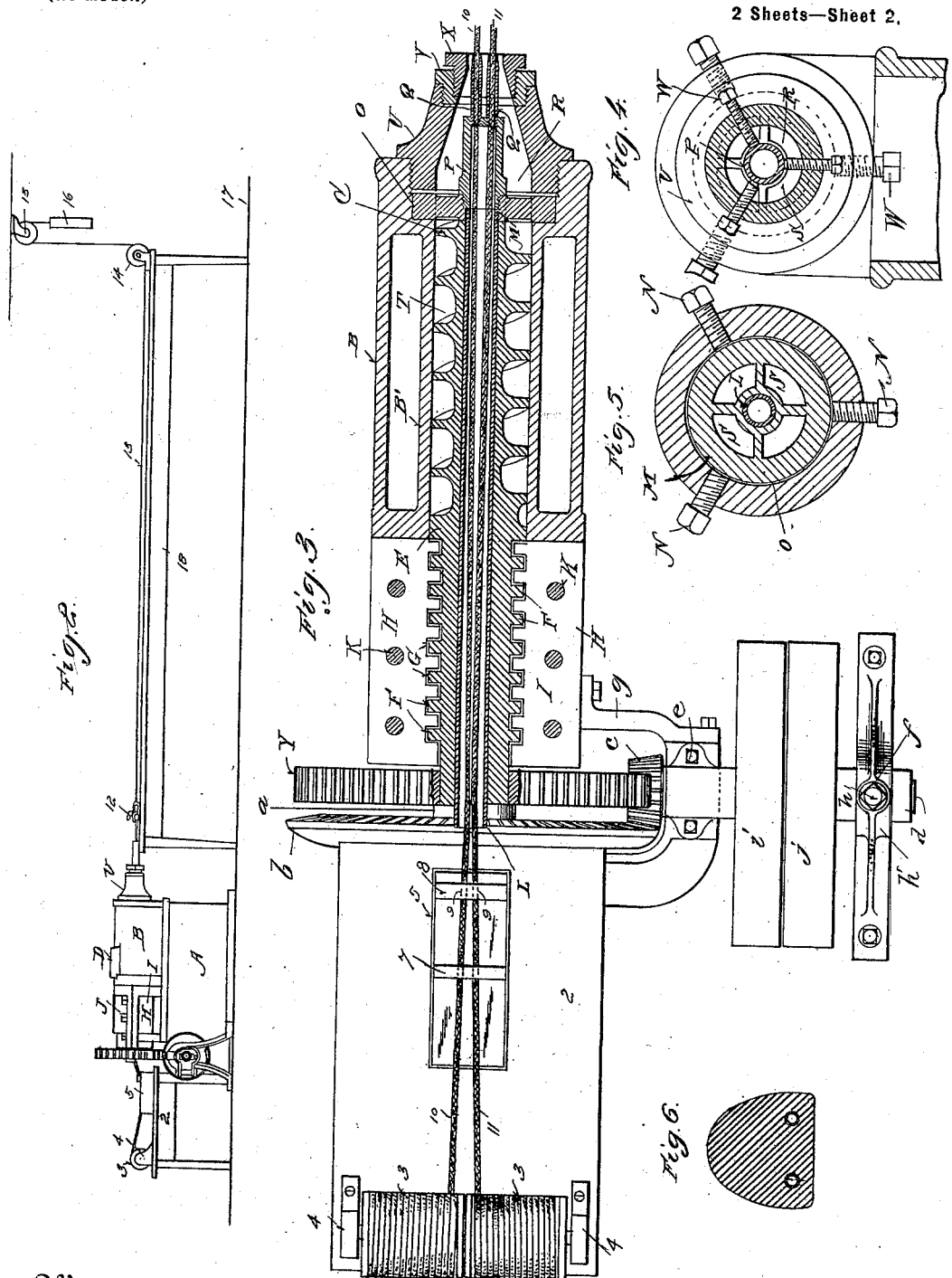

UNITED STATES PATENT OFFICE.

ALBERT T. HOLT, OF SPRINGFIELD, OHIO.

APPARATUS FOR PLACING LINING IN OPENINGS IN PLASTIC MATERIAL.

SPECIFICATION forming part of Letters Patent No. 653,242, dated July 10, 1900.

Application filed October 24, 1899. Serial No. 734,625. (No model.)

*To all whom it may concern:*

Be it known that I, ALBERT T. HOLT, a citizen of the United States, residing at Springfield, in the county of Clark and State of Ohio, have invented certain new and useful Improvements in Apparatus for Placing Lining in Openings in Plastic Material, of which the following is a specification, reference being had therein to the accompanying drawings.

This invention relates to certain new and useful improvements in an apparatus for placing lining in openings in vehicle-tires and other like articles made from plastic material.

The general object of my invention is to place within one or more holes formed in such plastic material a lining, preferably of fabric, such lining being treated with a coating of cement, so that it will adhere to the plastic material instead of collapsing, as it were, whereby retaining-wires may be readily passed through such lining, particularly when the plastic material is used for vehicle-tires.

Another object of my invention is to provide means for causing the fabric lining to travel with the same rapidity as the plastic material, so that the two will travel together.

My invention also relates to details of construction and arrangement hereinafter appearing, and particularly pointed out in the claims.

In the accompanying drawings, on which like reference letters and numerals indicate corresponding parts, Figure 1 is a side elevation of one form of machine adapted for use in my process; Fig. 2, a similar view to Fig. 1 on a reduced scale and also showing the manner in which the lining is drawn from the machine along with the plastic material. Fig. 3 is a longitudinal sectional view on the line $x\ x$ of Fig. 1 looking in the direction of the arrows. Fig. 4 is a cross-sectional view on the line $y\ y$ of Fig. 1 looking in the direction of the arrows; and Fig. 5, a sectional view on the line $z\ z$ of Fig. 1, also looking in the direction of the arrows; Fig. 6, a sectional view on the line $a\ a$ of Fig. 1.

My invention is particularly applicable to placing within a vehicle rubber tire a tubular lining, through which a retaining-wire is passed to hold the rubber in place in its channel-seat, while at the same time the wire is out of direct contact with the rubber, so that the deleterious effect of rubber upon the wire is prevented, and at the same time by reason of such lining the amount of rubber required in a tire is lessened.

A represents a base carrying a steam or hot-water jacket B, within which is formed a cylinder B', containing a worm C, the hot water or steam immediately surrounding such cylinder, as shown in section in Fig. 3. A mouth or opening D leads into the worm C, as shown in Figs. 1 and 2, and through this opening is inserted rubber or other suitable plastic material, such rubber being heated by the steam or hot water in the jacket B, so that it is softened to a greater extent and more readily passes through the machine, and assumes the proper form in a manner hereinafter appearing. The worm C is formed on a sleeve E, such sleeve also carrying a number of flanges F, which fit within annular recesses G in the surrounding covering H, such surrounding cover being formed in sections I and J, respectively, the section I being stationary, while the section J may be removed when desired by removing the screws K. Thus the worm-sleeve may be readily inserted in place when the section J is removed and before the water-jacket and cylinder are connected therewith. After it is placed in position the flanges F, engaging with such sections, prevent any longitudinal movement of the sleeve. Within this sleeve is placed a stationary tube L, which screws into a bearing M at one end and projects beyond the sleeve at its other end. The bearing M is secured to the outer casing or jacket B by means of set-screws N, which pass through the jacket against the bearing M, such bearing being annular, as shown in Fig. 5, to fit within the annular recess O in the jacket. A hollow mandrel-support P is also screwed into the bearing M and carries at its outer end a pair of hollow mandrels Q. About the mandrels and mandrel-support is formed a passage R, which communicates, through the slotted openings S of the bearing M, with the worm-chamber T. In the outer end of the jacket and forming the outer walls of the passage R is screwed an elongated cap U, such cap carrying a screw-collar V, which is adapted to be held in a fixed position by means of set-screws W or in any other suitable manner. Within this collar is secured a former X, the interior of which is of the same contour as it is desired the article to have, such article being shaped as it passes through such former in a manner hereinafter to be described. By this arrangement the former may be secured perfectly tight within the collar V, while to adjust it with respect to the mandrels Q the set-screws W may be loosened sufficiently to permit the collar to be turned to the desired position to accommodate itself to the proper relative position of the former with respect to the mandrels. Referring again to the worm-sleeve, it will be observed that on its outer end is mounted a gear Y. This gear is rigidly secured to the worm-sleeve in any suitable manner. Beneath such gear is mounted a driving-gear Z, (see dotted line in Fig. 1,) which is secured to a shaft $a$. Upon this shaft is also secured a bevel-gear $b$, driven by a bevel-pinion $c$, mounted on the inner end of a shaft $d$, such shaft being supported in the bearings $e$ and $f$, respectively, the bearing $e$ being carried by a bracket $g$, projecting from the body of the machine. The bearing $f$ is adjustable by means of adjusting-screws $h$. This bearing is secured by a standard $h'$. Loose and tight pulleys $i$ and $j$, respectively, are mounted upon the shaft $d$. Thus when the shaft $d$ is rotated the worm C will also be rotated, so that as rubber is fed into the worm-chamber through the mouth or opening D the screw will constantly advance it to the passage R about the mandrel-support. As more and more plastic material enters the passage R it will be forced out through the former and also around the mandrels, so that as it leaves the former the mandrels make passages therein side by side. (See the sectional view Fig. 6.) The steam-chamber is supplied with a circulation of steam through the pipes $k$ $m$, the flow of steam being regulated by the cocks $n$ $o$.

As above stated, the mandrels are hollow, so that there is a passage entirely through the central portion of the machine—that is, through the inner tube L and the mandrel-support, as also the mandrels.

Adjacent to the machine just described is placed a table or stand 2, upon which is mounted a tubular tape-roll 3, rotatably mounted in bearing-brackets 4, screwed or otherwise secured to the table. By referring to the plan view as shown in Fig. 3 it will be seen that two tape-rolls are placed side by side.

Adjacent to one end of the machine on the table 2 is mounted a guide-box 5, which is adapted to hold liquid cement, as indicated at 6. (See Fig. 1.) A cross-strip 7 extends across the box and projects within the cement. Another cross-piece 8 extends across the box near its inner end, such cross-piece being provided with holes 9, preferably placed side by side in the same plane for guiding the linings. One end of the hollow lining-tape 10 is placed beneath the cross-strip 7 through one of the openings or holes 9, through the central tube L, through the mandrel-support P, and one of the mandrels Q, while the other lining-tape 11 lies parallel with the first tape and extends through the other mandrel Q. A clamp or other suitable device, such as indicated at 12, (see Fig. 2,) is adapted to engage with one of the ends of each of the tubular linings. To this clamp is secured a rope 13, which passes beneath a pulley 14, over a pulley 15, and connected at its other end to a weight 16. The machine is then set in motion, and the rubber or other plastic material is fed into the screw-chamber, from whence it is forced through the former X in the manner above referred to. Thus as the plastic material is forced through the former it is formed with holes about the tubular linings by means of the mandrels, the movement of the linings being regulated by the weight 16 to travel with the same rapidity that the plastic material is forced through the former. When the weight has reached the floor 17, upon which the machine is mounted, the plastic tire will have been projected from the machine to near the pulley 14, at which time the long strip of plastic material is severed close to the former and the clamp 12 is released and again pulled to the position indicated in Fig. 2, where it is a second time clamped to the tubular linings.

In order to support the plastic material after it has passed through the machine, I provide a table or platform 18, such table being adapted to hold a number of strips of plastic material.

Thus with my invention the plastic material is not only strengthened by the tubular linings, but it is considerably lightened, so that vehicle-tires—for which this invention is specially adapted—are much cheapened by reason of the linings displacing their thickness in rubber, and at the same time the linings prevent corrosion of a retaining device, such as commonly employed in rubber-tire equipments for vehicles.

Having thus fully described my invention, what I claim as new, and desire to secure by Letters Patent, is—

1. In a machine for placing lining within openings in plastic material, the combination with a former, a feed device for feeding plastic material into said former, said feeding device having a longitudinal passage therein, a stationary tube extending through said passage, a mandrel-support forming a continuation of said tube and carrying one or more hollow mandrels projecting within said former, a lining-holder mounted adjacent to one end of said machine and carrying one or more lining-rolls, as also a liquid-cement receptacle, means for guiding said linings into said cement, and means for feeding said lining into the plastic material as rapidly as such material is being formed, all substantially as shown and described.

2. In a machine for placing lining within openings in plastic material, the combination with a former adapted to shape plastic material, means for feeding said plastic material and causing it to pass through said former, one or more mandrels having longitudinal passages therein projecting within said former, said machine also having a longitudinal passage therein communicating with said mandrels, a lining-support, a receptacle for liquid cement, means to guide said lining into said liquid cement and means for guiding said lining into the longitudinal passage in said machine, and a device for clamping said lining after passing through the former, a rope carrying a weight at one end and at its other end connected to said device, said rope passing beneath one pulley and over another pulley, substantially as shown and described.

3. In a machine for placing lining within openings in plastic material, the combination with a former, a feed device for feeding plastic material to said former, said feeding device having a longitudinal passage therein, a stationary tube extending through said passage, a mandrel-support forming a continuation of said tube and carrying a pair of hollow mandrels adapted to project within said former, a lining-holder mounted adjacent to one end of said machine and carrying a pair of lining-rolls, as also a liquid-cement receptacle, means for guiding said linings into said cement and tube, such linings being adapted to extend through the mandrel-support, as also through said mandrels, a rope carrying a weight at one end and a clamp at the other, said clamp being adapted to engage with said linings after passing through said mandrels and adapted to draw the linings along with the same rapidity as plastic material passes through said former, all substantially as shown and described.

4. In a machine for placing lining within openings in plastic material, the combination with a machine proper, of a lining-support and cement-receptacle mounted adjacent to one end of said machine proper and a plastic-material support mounted adjacent to the other end of said machine proper, a former carried by said machine proper and adapted to form plastic material passing through such machine, a pair of mandrels projecting into said former each having a longitudinal opening therein, said machine also having a longitudinal central opening communicating with said mandrel-openings, and a rope carrying a clamp at one end and a weight at its other end and adapted to extend around a pulley to engage the linings after passing through said machine proper and to cause them to travel with the same rapidity as plastic material passes through said former, all substantially as shown and described.

In testimony whereof I affix my signature in presence of two witnesses.

ALBERT T. HOLT.

Witnesses:
 B. B. ESTERLINE,
 F. W. SCHAEFER.